United States Patent
Ghil et al.

(10) Patent No.: US 11,349,139 B2
(45) Date of Patent: May 31, 2022

(54) METHOD FOR PREPARING CATALYST LAYER, CATALYST LAYER, AND MEMBRANE-ELECTRODE ASSEMBLY COMPRISING SAME AND FUEL CELL

(71) Applicant: LG CHEM, LTD., Seoul (KR)

(72) Inventors: Lee Jin Ghil, Daejeon (KR); Doyoung Kim, Daejeon (KR); Woon Jo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 82 days.

(21) Appl. No.: 16/644,623

(22) PCT Filed: Jan. 17, 2019

(86) PCT No.: PCT/KR2019/000697
§ 371 (c)(1),
(2) Date: Mar. 5, 2020

(87) PCT Pub. No.: WO2019/146959
PCT Pub. Date: Aug. 1, 2019

(65) Prior Publication Data
US 2021/0083308 A1    Mar. 18, 2021

(30) Foreign Application Priority Data

Jan. 26, 2018  (KR) .................. 10-2018-0009860

(51) Int. Cl.
| | | |
|---|---|---|
| *H01M 8/10* | (2016.01) | |
| *H01M 8/1004* | (2016.01) | |
| *H01M 4/86* | (2006.01) | |
| *H01M 4/88* | (2006.01) | |
| *H01M 4/92* | (2006.01) | |

(52) U.S. Cl.
CPC ....... *H01M 8/1004* (2013.01); *H01M 4/8652* (2013.01); *H01M 4/8828* (2013.01); *H01M 4/8892* (2013.01); *H01M 4/926* (2013.01); *H01M 2008/1095* (2013.01)

(58) Field of Classification Search
CPC ............. H01M 8/1004; H01M 4/8652; H01M 4/4647; H01M 4/8657; H01M 4/8828; H01M 4/8842; H01M 4/8892; H01M 4/926; H01M 2008/1095
See application file for complete search history.

(56) References Cited

U.S. PATENT DOCUMENTS

| | | |
|---|---|---|
| 2004/0121219 A1 | 6/2004 | Mei et al. |
| 2008/0032173 A1 | 2/2008 | Koyama et al. |
| 2008/0191161 A1 | 8/2008 | Behl et al. |
| 2010/0086821 A1* | 4/2010 | Kwon ................. H01M 4/8828 429/457 |
| 2017/0066892 A1* | 3/2017 | Adachi ............... H01M 8/1004 |
| 2018/0251631 A1 | 9/2018 | Lee |

FOREIGN PATENT DOCUMENTS

| | | |
|---|---|---|
| JP | 2002246033 | 8/2002 |
| JP | 2008065986 A | 3/2008 |
| JP | 2009224031 | 10/2009 |
| KR | 1020070116083 | 12/2007 |
| KR | 1020100038543 | 4/2010 |
| KR | 1020120061484 | 6/2012 |
| KR | 1020160128140 | 11/2016 |
| KR | 1020170069783 | 6/2017 |
| KR | 1020170079591 | 7/2017 |
| KR | 1020170089486 | 8/2017 |

OTHER PUBLICATIONS

International Search Report corresponding to PCT/KR2019/000697, dated Apr. 17, 2019 (6 pages including English translation).
Safety Data Sheet: 20% Nation™ Dispersion Solution DE2020 CS type (18 pages, including English translation).

\* cited by examiner

*Primary Examiner* — Raymond Alejandro
(74) *Attorney, Agent, or Firm* — Myers Bigel, P.A.

(57) ABSTRACT

Methods for manufacturing a catalyst layer of a membrane-electrode assembly may include preparing a solution including an ionomer and a solvent, forming a catalyst slurry composition by adding a carbon powder catalyst to the solution, forming a catalyst layer by applying the catalyst slurry composition onto a base material, and then drying the catalyst slurry composition.

6 Claims, 2 Drawing Sheets

METHOD FOR PREPARING CATALYST LAYER, CATALYST LAYER, AND MEMBRANE-ELECTRODE ASSEMBLY COMPRISING SAME AND FUEL CELL

CROSS REFERENCE TO RELATED APPLICATIONS

This application is a 35 U.S.C. § 371 national stage application of PCT International Application No. PCT/KR2019/000697, filed Jan. 17, 2019, which claims priority from Korean Patent Application No. 10-2018-0009860, filed Jan. 26, 2018, the contents of which are incorporated herein in their entireties by reference. The above-referenced PCT International Application was published in the Korean language as International Publication No. WO 2019/146959 on Aug. 1, 2019.

TECHNICAL FIELD

The present specification relates to a method for manufacturing a catalyst layer, a catalyst layer, and a membrane-electrode assembly and a fuel cell including the same.

BACKGROUND ART

For a hydrocarbon-based membrane-electrode assembly (MEA), there is a need for studies on maintaining a constant amount of solvent in a catalyst electrode in order to assemble an electrolyte membrane and the catalyst electrode unlike a fluorine-based membrane-electrode assembly (MEA). The solvent in the catalyst electrode largely has an advantage in that the solvent in the catalyst electrode serves to increase a transfer rate to the electrolyte membrane, and simultaneously, facilitates the control of occurrence of cracks and dispersion of electrode slurry when the catalyst electrode is stored for a long period of time and the electrode slurry is manufactured. However, the solvent in the catalyst electrode has a problem in that the solvent acts as an element that hinders the activity of the membrane-electrode assembly (MEA). The activation (aging) of the membrane-electrode assembly is largely performed in order to activate the catalyst electrode, supply water in the membrane-electrode assembly (MEA), and remove the solvent remaining in the membrane-electrode assembly (MEA), and in this case, the solvent in the catalyst electrode acts as a solvent remaining in the membrane-electrode assembly (MEA) to reduce an activation rate of the membrane-electrode assembly (MEA).

Currently, a solvent used most frequently as the solvent in the electrode is glycerol. In terms of the activity of the membrane-electrode assembly (MEA), glycerol is not perfectly removed during the transfer of the membrane-electrode assembly (MEA) because glycerol has a boiling point of about 290° C., and glycerol is slowly removed depending on the flow and reaction of gas/water during the activation process. In particular, glycerol has a disadvantage in that it is difficult to remove glycerol due to a high viscosity thereof. Therefore, a solvent which is easily removed while acting like glycerol needs to be used in order to improve the activation rate of the membrane-electrode assembly (MEA).

DETAILED DESCRIPTION OF INVENTION

Technical Problem

The present specification has been made in an effort to provide a method for manufacturing a catalyst layer, a catalyst layer, and a membrane-electrode assembly and a fuel cell including the same.

Technical Solution

An exemplary embodiment of the present specification provides a method for manufacturing a catalyst layer, the method including: preparing a solution including: an ionomer; and a solvent including 2-ethoxyethanol and an alcohol-based solvent having 1 to 6 carbon atoms; forming a catalyst slurry composition by adding a carbon powder catalyst to the solution; and forming a catalyst layer by applying the catalyst slurry composition onto a base material, and then drying the catalyst slurry composition, in which a weight ratio of the carbon powder catalyst, the alcohol-based solvent having 1 to 6 carbon atoms, and the 2-ethoxyethanol in the catalyst slurry composition is 1:2.5:2.5 to 1:4.5:4.5, and a content of the solvent including the 2-ethoxyethanol and the alcohol-based solvent having 1 to 6 carbon atoms in the catalyst layer is 10 parts by weight to 20 parts by weight based on 100 parts by weight of the catalyst layer.

Further, an exemplary embodiment of the present specification provides a catalyst layer including: a carbon powder catalyst; an ionomer; and a solvent including 2-ethoxyethanol and an alcohol-based solvent having 1 to 6 carbon atoms, in which a content of the solvent including the 2-ethoxyethanol and the alcohol-based solvent having 1 to 6 carbon atoms is 10 parts by weight to 20 parts by weight based on 100 parts by weight of the catalyst layer.

In addition, an exemplary embodiment of the present specification provides a membrane-electrode assembly including an anode catalyst layer, a cathode catalyst layer, and a polymer electrolyte membrane provided between the anode catalyst layer and the cathode catalyst layer, in which at least one of the anode catalyst layer and the cathode catalyst layer includes the above-described catalyst layer.

Furthermore, an exemplary embodiment of the present specification provides a fuel cell including the above-described membrane-electrode assembly (MEA).

Advantageous Effects

A method for manufacturing a catalyst layer according to an exemplary embodiment of the present specification may improve the dispersibility of an ionomer, and simultaneously, have an excellent membrane-electrode assembly (MEA) internal activation rate, as compared to that of a catalyst layer manufactured using glycerol, by forming a catalyst layer by steps of forming a catalyst slurry composition to which a solvent including 2-ethoxyethanol is added, and then re-homogenizing the catalyst slurry composition by subjecting the catalyst slurry composition to sonication.

Further, the method for manufacturing a catalyst layer according to an exemplary embodiment of the present specification may reduce an ionomer aggregation phenomenon and a crack phenomenon as compared to the existing manufacturing methods.

In addition, the method for manufacturing a catalyst layer according to an exemplary embodiment of the present specification reduces the permeation of fuel by reducing an ionomer aggregation phenomenon and a crack phenomenon, so that an open circuit voltage (OCV) of the fuel cell is improved, thereby improving the performance of the fuel cell.

Figure 1:
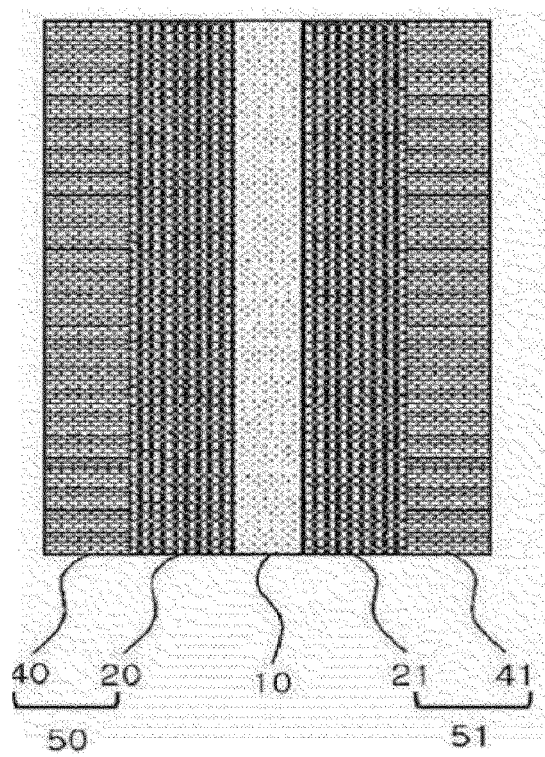
FIG. 1 is a view schematically illustrating a structure of a membrane-electrode assembly.

10: Electrolyte membrane
20: Cathode catalyst layer
21: Anode catalyst layer
40: Cathode gas diffusion layer
41: Anode gas diffusion layer
50: Cathode
51: Anode

BEST MODE

Hereinafter, the present specification will be described in more detail.

In the present specification, "on" means not only being disposed while being physically brought into contact with one layer, but also being disposed on the one layer in position. That is, a layer disposed on any one layer may also have another layer therebetween.

When one part "includes" one constituent element in the present specification, unless otherwise specifically described, this does not mean that another constituent element is excluded, but means that another constituent element may be further included.

An exemplary embodiment of the present specification provides a method for manufacturing a catalyst layer, the method including: preparing a solution including: an ionomer; and a solvent including 2-ethoxyethanol and an alcohol-based solvent having 1 to 6 carbon atoms; forming a catalyst slurry composition by adding a carbon powder catalyst to the solution; and forming a catalyst layer by applying the catalyst slurry composition onto a base material, and then drying the catalyst slurry composition, in which a weight ratio of the carbon powder catalyst, the alcohol-based solvent having 1 to 6 carbon atoms, and the 2-ethoxyethanol in the catalyst slurry composition is 1:2.5:2.5 to 1:4.5:4.5, and a content of the solvent including the 2-ethoxyethanol and the alcohol-based solvent having 1 to 6 carbon atoms in the catalyst layer is 10 parts by weight to 20 parts by weight based on 100 parts by weight of the catalyst layer.

When a catalyst layer is manufactured by using the solvent including 2-ethoxyethanol, 2-ethoxyethanol has a boiling point of 135° C., so that a drying process is performed at a lower temperature and a shorter drying time than the case where a solvent having a higher boiling point than 135° C., which is used in the related art, for example, a solvent such as glycerol (boiling point: 290° C.) is used. Accordingly, in a transfer process of a membrane-electrode assembly (MEA) including the catalyst layer, it is possible to obtain a similar transfer rate and a similar performance while having an improved activation rate.

In an exemplary embodiment of the present specification, the solution may include: an ionomer; and a solvent including 2-ethoxyethanol and an alcohol-based solvent having 1 to 6 carbon atoms.

In the present specification, as the carbon powder catalyst, it is possible to use a catalyst in which a metal is carried on the surface of a carbon powder.

In the present specification, as the carbon powder catalyst, it is possible to use a catalyst (Pt/C) in which platinum is carried on the surface of a carbon powder.

As the carbon powder, it is possible to use one or a mixture of two or more selected from the group consisting of graphite, carbon black, acetylene black, Denka black, Ketjen black, activated carbon, mesoporous carbon, carbon nanotube, carbon nano fiber, carbon nano horn, carbon nano ring, carbon nano wire, fullerene (C60), and Super P, but the carbon powder is not limited thereto.

In the carbon powder catalyst (Pt/C) in which platinum is carried, an amount of platinum carried based on carbon is preferably 10 parts by weight to 80 parts by weight, and more preferably 30 parts by weight to 70 parts by weight, based on 100 parts by weight of carbon, but is not limited thereto.

When the amount of platinum carried based on carbon is more than 80 parts by weight, there may occur a problem in that the thickness of the electrode in the membrane-electrode assembly becomes thinner. When the thickness of the electrode becomes thinner, the probability that hydrogen and oxygen gases directly reach the membrane without being oxidized/reduced in the electrode layer is increased, so that there may occur a problem in that the entire performance of the membrane-electrode assembly is reduced, and the durability deteriorates.

In an exemplary embodiment of the present specification, the ionomer is a fluorine-based polymer.

Specifically, the ionomer may serve to provide a channel through which ions produced by reaction between fuel such as hydrogen or methanol and a catalyst move to an electrolyte membrane.

In the present specification, the ionomer may be a perfluorosulfonic acid (PFSA)-based polymer or a perfluorocarboxylic acid (PFCA)-based polymer. As the perfluorosulfonic acid-based polymer and the perfluorocarboxylic acid-based polymer, Nafion (manufactured by Dupont Co., Ltd.) and Flemion (manufactured by Asahi Glass Co., Ltd.) may be used, respectively.

According to an exemplary embodiment of the present specification, the ionomer may have a weight average molecular weight of 240 g/mol to 200,000 g/mol, and specifically 240 g/mol to 10,000 g/mol.

In the present specification, a content of the ionomer is preferably 5 parts by weight to 150 parts by weight based on 100 parts by weight of the carbon powder catalyst, but is not limited thereto.

When the content of the ionomer is less than 5 parts by weight based on the carbon powder catalyst, ions are not properly transferred to the electrolyte membrane, and when the content of the ionomer is more than 150 parts by weight based on the carbon powder catalyst, the ionomer blocks the permeation of gas, thereby degrading the performance of the membrane-electrode assembly.

In an exemplary embodiment of the present specification, the alcohol-based solvent having 1 to 6 carbon atoms is a solvent that may disperse the catalyst, and it is preferred that a solvent which can be evaporated within a range of 30° C. to 100° C. is used. Accordingly, water or an alcohol-based solvent such as methanol, ethanol, and propanol is suitable.

When a solvent having a high volatilization temperature, for example, a solvent which can be evaporated at a temperature more than 100° C. is used as the alcohol-based solvent having 1 to 6 carbon atoms, during the manufacture of an electrode, the density of the electrode becomes compact, so that it is difficult to form pores, thereby affecting the degradation in performance.

Further, since 2-ethoxyethanol is used for assembling the membrane-electrode assembly (MEA) and maintaining the remaining solvent, it is not suitable for 2-ethoxyethanol to be used as the alcohol-based solvent having 1 to 6 carbon atoms. In addition, since 2-ethoxyethanol has a boiling point of 135° C., which is out of a temperature range suitable for the alcohol-based solvent having 1 to 6 carbon atoms, it is not suitable for 2-ethoxyethanol to be used as the alcohol-based solvent having 1 to 6 carbon atoms.

The alcohol-based solvent having 1 to 6 carbon atoms may be one or two or more selected from the group consisting of water, methanol, ethanol, butanol, 1-propanol, and isopropanol. Preferably, the alcohol-based solvent having 1 to 6 carbon atoms may be water or 1-propanol, but is not limited thereto.

In an exemplary embodiment of the present specification, the alcohol-based solvent having 1 to 6 carbon atoms includes water.

In an exemplary embodiment of the present specification, the alcohol-based solvent having 1 to 6 carbon atoms is 1-propanol.

In an exemplary embodiment of the present specification, the alcohol-based solvent having 1 to 6 carbon atoms includes water and 1-propanol.

In the present specification, a content of the alcohol-based solvent having 1 to 6 carbon atoms is preferably 5 parts by weight to 99 parts by weight based on 100 parts by weight of the entire catalyst slurry composition, but is not limited thereto. Specifically, the content may be 5 parts by weight to 30 parts by weight, preferably 10 parts by weight to 20 parts by weight.

In an exemplary embodiment of the present specification, the solvent including 2-ethoxyethanol and the alcohol-based solvent having 1 to 6 carbon atoms may be composed of 2-ethoxyethanol and an alcohol-based solvent having 1 to 6 carbon atoms.

When the solvent including 2-ethoxyethanol and the alcohol-based solvent having 1 to 6 carbon atoms is composed of 2-ethoxyethanol and an alcohol-based solvent having 1 to 6 carbon atoms, 2-ethoxyethanol and the alcohol-based solvent having 1 to 6 carbon atoms may satisfy a weight ratio of 1:1 to 2:1, preferably a weight ratio of 2:1. When 2-ethoxyethanol and the alcohol-based solvent having 1 to 6 carbon atoms satisfy a weight ratio of 2:1, the drying time is easily controlled while maintaining the dispersibility of the catalyst.

In an exemplary embodiment of the present specification, when the solvent including 2-ethoxyethanol and the alcohol-based solvent having 1 to 6 carbon atoms is composed of 2-ethoxyethanol and an alcohol-based having 1 to 6 carbon atoms, a content of the 2-ethoxyethanol is preferably 30 parts by weight to 70 parts by weight based on 100 parts by weight of the catalyst slurry composition, but is not limited thereto.

In an exemplary embodiment of the present specification, a weight ratio of a carbon catalyst powder, an alcohol-based solvent having 1 to 6 carbon atoms, and 2-ethoxyethanol in the catalyst slurry composition may satisfy 1:2.5:2.5 to 1:4.5:4.5.

In another exemplary embodiment of the present specification, a weight ratio of a carbon catalyst powder, an alcohol-based solvent having 1 to 6 carbon atoms, and 2-ethoxyethanol in the catalyst slurry composition may satisfy 1:3:3 to 1:4:4.

In the catalyst slurry composition, when the content of 2-ethoxyethanol is more than a range of the above-described weight ratio of the carbon catalyst powder, the alcohol-based solvent having 1 to 6 carbon atoms, and 2-ethoxyethanol, the catalyst slurry composition is in a precipitate state, so that a stable dispersion state cannot be achieved. Furthermore, when the content of 2-ethoxyethanol is less than a range of the above-described weight ratio of the carbon catalyst powder, the alcohol-based solvent having 1 to 6 carbon atoms, and 2-ethoxyethanol, the amount of solvent remaining in the drying process after the manufacture of the electrode is insufficient, so that there may occur a problem in that the electrode is not effectively transferred to one surface or both surfaces of the electrolyte membrane.

In the present specification, the remaining solvent means all the remaining solvents in a catalyst layer manufactured by the method for manufacturing a catalyst layer, and an amount of solvent remaining (%) means at what percentage the weight of all the solvents included in the catalyst layer is included based on 100 parts by weight of the catalyst layer.

In an exemplary embodiment of the present specification, a content of the solvent including 2-ethoxyethanol and the alcohol-based solvent having 1 to 6 carbon atoms, which is included in the catalyst layer, may be 10 parts by weight to 20 parts by weight, preferably 10 parts by weight to 15 parts by weight, based on 100 parts by weight of the catalyst layer.

When the content of the solvent including 2-ethoxyethanol and the alcohol-based solvent having 1 to 6 carbon atoms in the catalyst layer is more than 20 parts by weight based on 100 parts by weight of the catalyst layer, the solvent is suddenly volatilized during the transfer of the catalyst layer to the electrolyte membrane, so that a gas trap phenomenon breaking the electrode structure may occur.

When the content of the solvent including 2-ethoxyethanol and the alcohol-based solvent having 1 to 6 carbon atoms in the catalyst layer is less than 10 parts by weight based on 100 parts by weight of the catalyst layer, the amount of solvent remaining is insufficient, so that there may occur a problem in that the electrode is not effectively transferred to one surface or both surfaces of the electrolyte membrane.

In the forming of the catalyst layer by applying the catalyst slurry composition of the present specification onto a base material, and then drying the catalyst slurry composition, the drying may be performed within a range of 30° C. to 40° C. for 30 minutes or less.

Through the drying process performed within the range of 30° C. to 40° C. for 30 minutes or less, the content of the solvent including 2-ethoxyethanol and the alcohol-based solvent having 1 to 6 carbon atoms in the catalyst layer may be adjusted within a range of 10 parts by weight to 20 parts by weight based on 100 parts by weight of the catalyst layer.

Figure 2:
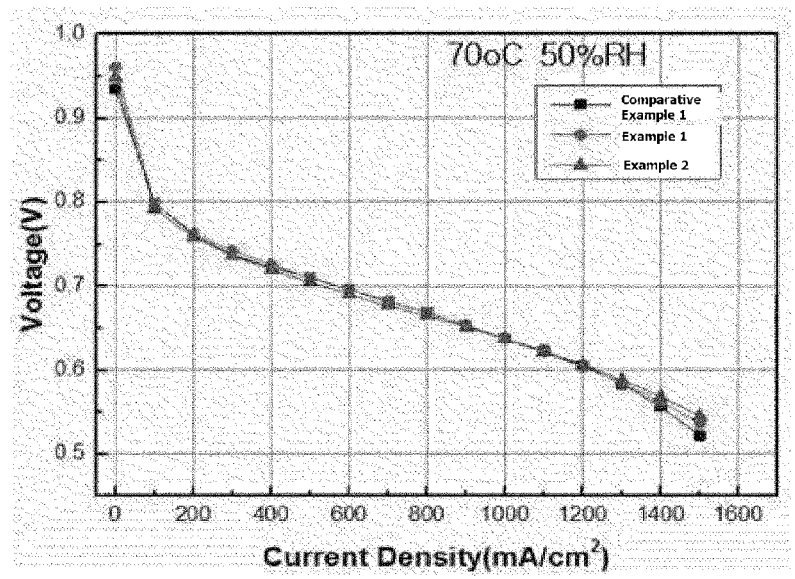
FIG. 2 illustrates the performances of electrodes manufactured by the methods for manufacturing a membrane-electrode assembly according to Examples 1 and 2 and Comparative Example 1 of the present specification.

FIG. 2 illustrates a result in which a case of a fuel cell manufactured by using 2-ethoxyethanol for assembling the membrane-electrode assembly (MEA) and maintaining the remaining solvent (Examples 1 and 2) exhibits a similar performance as compared to a case of a fuel cell manufactured by using glycerol (Comparative Example 1).

Figure 3:
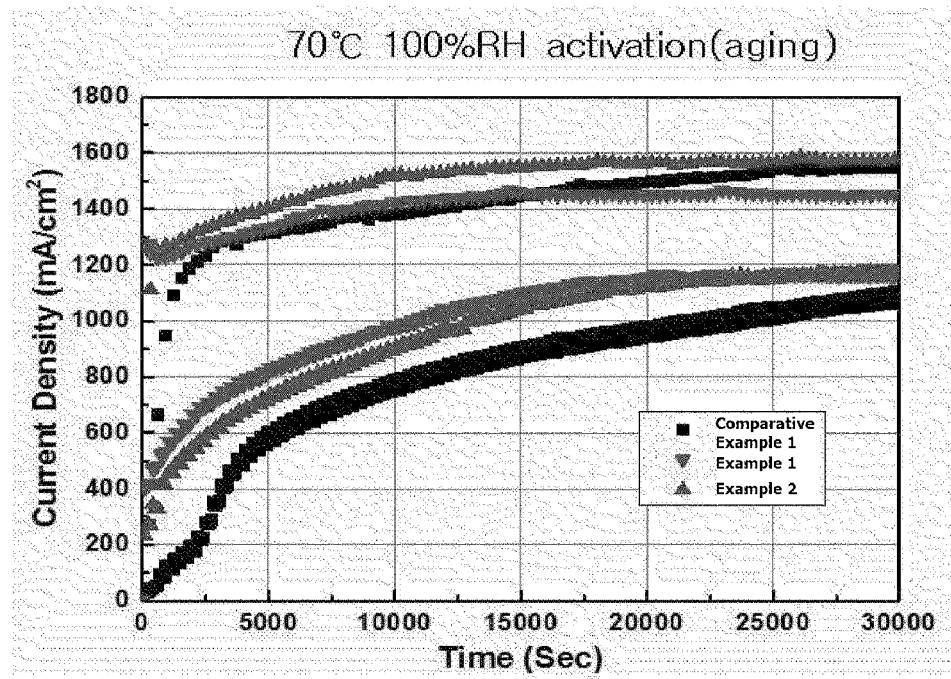
FIG. 3 illustrates the activation rates of electrodes manufactured by the methods for manufacturing a membrane-electrode assembly according to Examples 1 and 2 and Comparative Example 1 of the present specification.

Further, FIG. 3 illustrates that in the case of a membrane-electrode assembly (MEA) manufactured by using 2-ethoxyethanol for assembling the membrane-electrode assembly (MEA) and maintaining the remaining solvent (Examples 1 and 2), the activation rate and the saturation rate are improved as compared to the case of a membrane-electrode assembly (MEA) manufactured by using glycerol (Comparative Example 1).

In an exemplary embodiment of the present specification, homogenizing the catalyst slurry composition, which is formed through the forming of the catalyst slurry composition by adding the carbon powder catalyst to the solution, by subjecting the catalyst slurry composition to sonication may be performed.

In the present specification, the sonication may be composed of a tip type or a bath type.

In the present specification, the sonication means a behavior that disperses particles by adding energy having a frequency of 20 kHz or more to the particles, energy having a relatively low and constant size is used in the bath type, and in the tip type, high energy amounting to about 50 times that of the bath type may be variably added.

In general, ionomers are aggregated with one another in the solvent by electrostatic attractive force and thus present as an aggregate having a particle diameter of 0.01 μm to 1 μm, and a unit particle formed by the aggregation of the ionomers in the solvent is referred to as an ionomer cluster. When the ionomer clusters are dispersed through sonication, specifically, the tip type or bath type sonication, most of the ionomer clusters are uniformly dispersed so as to have an average particle diameter of 10 nm to 500 nm, preferably 10 nm to 300 nm.

The tip type sonication may be performed for 10 minutes to 30 minutes, but the time is not limited thereto. The bath type sonication may be performed for 20 minutes to 120 minutes, preferably 30 minutes to 60 minutes.

When the sonication is performed within the above time range, it is possible to prevent the occurrence of a topical ionomer aggregation phenomenon. When the sonication is performed more than the above time range, the dispersion effect as compared to time is not significant, so that the sonication may be inefficient.

In order to form a catalyst layer having a uniform structure, a sufficient absorption strength between the ionomer and a carbon support in the catalyst is important, and when a particle diameter of the ionomer is adjusted to be small through the sonication, the ionomer may be uniformly absorbed onto the carbon support in the catalyst.

In an exemplary embodiment of the present specification, a catalyst slurry composition in the form where the catalyst and the ionomer are dispersed in the solution maintains a precipitate state, so that in order for the catalyst slurry composition to be able to maintain a stable dispersion state, the method includes additionally performing the stirring of the catalyst slurry composition before the sonication step.

When the catalyst slurry composition is in a precipitate state and thus fails to achieve a stable dispersion state, the amount of catalyst dispersed varies, so that differences in amount of catalyst and dispersity of the catalyst at each portion occur, and the viscosity is randomly increased by aggregation of particles settling down on the bottom, so that it is difficult to obtain constant physical properties, but through the stirring step, the dispersity of catalyst particles is relatively narrowed, so that it is possible to prevent an aggregation phenomenon of particles and uniformly maintain the dispersion state of the catalyst slurry.

In an exemplary embodiment of the present specification, forming a catalyst layer by applying the catalyst slurry composition, which is subjected to the homogenizing of the catalyst slurry composition by subjecting the catalyst slurry composition to the sonication, onto a base material, and then drying the catalyst slurry composition is performed.

The base material is not particularly limited, but may be a fluorine-based film. Specifically, the base material may be selected from a polytetrafluoroethylene (PTFE) film, a polyethylene terephthalate (PET) film, a polyethylene naphthalate (PEN) film, and a polyimide (PI) film.

In an exemplary embodiment of the present specification, the application may be performed by one method selected from the group consisting of a spray coating method, a screen printing method, a tape casting method, a brushing method, a slot die casting method, a bar-casting method, and ink jetting.

In an exemplary embodiment of the present specification, the catalyst layer has a thickness of 5 μm to 15 μm.

An exemplary embodiment of the present specification provides a catalyst layer including: a carbon powder catalyst; an ionomer; and a solvent including 2-ethoxyethanol, in which a content of the solvent including 2-ethoxyethanol is 10 parts by weight to 20 parts by weight based on 100 parts by weight of the carbon powder catalyst in the catalyst layer.

The definitions of the carbon powder catalyst, the ionomer, and the solvent including 2-ethoxyethanol included in the catalyst layer are the same as those described above.

In addition, an exemplary embodiment of the present specification provides a membrane-electrode assembly including an anode catalyst layer, a cathode catalyst layer, and a polymer electrolyte membrane provided between the anode catalyst layer and the cathode catalyst layer, in which at least one of the anode catalyst layer and the cathode catalyst layer includes the catalyst layer.

The membrane-electrode assembly may further include a cathode gas diffusion layer provided on a surface opposite to a surface of the cathode catalyst layer on which the electrolyte membrane is provided and an anode gas diffusion layer provided on a surface opposite to a surface of the anode catalyst layer on which the electrolyte membrane is provided.

The anode gas diffusion layer and the cathode gas diffusion layer are each provided on a surface of the catalyst layer, serve as a current conductor and a channel through which a reaction gas and water move, and have a porous structure.

The gas diffusion layer is not particularly limited as long as the gas diffusion layer is generally a conductive base material having conductivity and a porosity of 80% or more, and may include a conductive base material selected from the group consisting of carbon paper, carbon cloth, and carbon felt. The conductive base material may have a thickness of 30 μm to 500 μm. When the thickness is a value within the above range, the balance between mechanical strength and diffusivity of gas and water may be appropriately controlled. The gas diffusion layer may be formed by further including a micropore layer formed on one surface of the conductive base material, and the micropore layer may be formed by including a carbon-based material and a fluorine-based resin. The micropore layer may suppress the occurrence of a flooding phenomenon by promoting the discharge of excessive moisture present in the catalyst layer.

As the carbon-based material, it is possible to use one or a mixture of two or more selected from the group consisting of graphite, carbon black, acetylene black, Denka black, Ketjen black, activated carbon, mesoporous carbon, carbon nanotube, carbon nano fiber, carbon nano horn, carbon nano ring, carbon nano wire, fullerene (C60), and Super P, but the carbon-based material is not limited thereto.

As the fluorine-based resin, it is possible to use one or a mixture of two or more selected from the group consisting of polytetrafluoroethylene, polyvinylidene fluoride (PVdF), polyvinyl alcohol, cellulose acetate, a copolymer of polyvinylidene fluoride-hexafluoropropylene (PVdF-HFP), and a styrene-butadiene rubber (SBR), but the fluorine-based resin is not limited thereto.

As a method of forming a catalyst layer by using the catalyst slurry composition, a typical method known in the art may be used, and for example, the catalyst layer may be formed by applying and drying the catalyst slurry composition onto the gas diffusion layer. In this case, a plurality of catalyst layers may also be formed by sequentially applying and drying catalyst slurry compositions having different contents of an ionomer.

In this case, examples of a method of applying the catalyst composition onto a gas diffusion layer include a method such as printing, tape casting, slot die casting, spray, rolling, blade coating, spin coating, inkjet coating, or brushing, but are not limited thereto. Preferably, the catalyst layer may be manufactured as a reinforced membrane by forming a membrane by a casting method using the catalyst slurry composition, or impregnating an ion conductive polymer into pores in a porous support.

The gas diffusion layer may have an average thickness of 200 μm to 500 μm. In this case, there is an advantage in that an optimum state is achieved from the viewpoint of minimizing the reactant gas transfer resistance through the gas diffusion layer and containing a suitable moisture in the gas diffusion layer.

FIG. 1 is a view schematically illustrating a structure of a membrane-electrode assembly, and the membrane-electrode assembly may include an electrolyte membrane 10, and a cathode 50 and an anode 51 positioned to face each other with the electrolyte membrane 10 interposed therebetween. Specifically, the cathode may include a cathode catalyst layer 20 and a cathode gas diffusion layer 40 which are provided sequentially from the electrolyte membrane 10, and the anode may include an anode catalyst layer 21 and an anode gas diffusion layer 41 which are provided sequentially from the electrolyte membrane 10.

Further, an exemplary embodiment of the present specification provides a fuel cell including the above-described membrane-electrode assembly.

MODE FOR INVENTION

Hereinafter, the present specification will be described in detail with reference to Examples for specifically describing the present specification. However, the Examples according to the present specification may be modified in various forms, and it is not interpreted that the scope of the present specification is limited to the Examples to be described below. The Examples of the present specification are provided to more completely explain the present specification to a person with ordinary skill in the art.

EXAMPLES

Example 1

3M 825 ionomer was added to a solution in which 1-propanol and 2-ethoxyethanol were mixed at a weight ratio of 3:4. Thereafter, a catalyst slurry composition was manufactured by adding a TEC 10V50E carbon powder catalyst sold by Tanaka Kikinzoku Kogyo K. K. thereto so as for a weight ratio of the ionomer and the carbon powder catalyst to be 0.66:1. In this case, in the catalyst slurry composition, a weight ratio of the carbon powder catalyst: 1-propanol:2-ethoxyethanol was 1:3:4. After the catalyst slurry composition was stirred at room temperature for 1 hour by using a magnetic stirrer, and then dispersed at room temperature for 1 hour by using a bath type ultrasonic dispersion machine, the temperature was decreased to a state of 50° C. or less, and the catalyst slurry composition was dispersed for 15 minutes by using a tip type ultrasonic dispersion machine. After a catalyst layer was cast onto a PTFE film with a doctor blade on a horizontal plate of an applicator in a clean bench by using the catalyst slurry composition, a catalyst layer was finally manufactured by drying the cast catalyst layer at 35° C. for 30 minutes.

Example 2

A catalyst layer was manufactured in the same manner as in Example 1, except that the carbon powder catalyst, 1-propanol, and 2-ethoxyethanol were mixed at a weight ratio of 1:3:3.

Comparative Example 1

A catalyst slurry composition was manufactured in the same manner as in Example 1, except that glycerol was used instead of 2-ethoxyethanol, and the carbon powder catalyst, 1-propanol, and glycerol were mixed at a weight ratio of 1:6.4:0.5. After a catalyst layer was cast onto a PTFE film with a doctor blade on a horizontal plate of an applicator in a clean bench by using the manufactured catalyst slurry composition, a catalyst layer was finally manufactured by drying the cast catalyst layer at 35° C. for 30 minutes and at 140° C. for 30 minutes.

Comparative Example 2

A catalyst layer was manufactured in the same manner as in Example 2, except that an electrode catalyst layer was cast onto a PTFE film, and then dried at 35° C. for 45 minutes.

Comparative Example 3

An electrode was manufactured in the same manner as in Example 1, except that the carbon powder catalyst, 1-propanol, and 2-ethoxyethanol were mixed at a weight ratio of 1:1:5.

In order to confirm the amount of solvent remaining (%), the remaining solvent was completely removed by measuring the weight of the manufactured electrode, and then drying the electrode in an oven at 140° C. overnight. Thereafter, the electrode was removed from a base material, and then the weight of the base material was measured. The amount of solvent remaining (%) could be ascertained by the following Equation 1.

$$\text{Amount of solvent remaining (\%)} = \frac{\begin{pmatrix}\text{Weight of electrode before} \\ \text{being dried overnight}\end{pmatrix} - \begin{pmatrix}\text{Weight of electrode after} \\ \text{being dried overnight}\end{pmatrix}}{\text{Weight of electrode before} - \text{Weight of base}} \times 100 \quad \text{[Equation 1]}$$
$$\text{being dried overnight} \quad \text{material}$$

The transfer states and amounts of solvent remaining (%) of the catalyst layers according to Examples 1 and 2 and Comparative Examples 1 to 3 are shown in the following Table 1.

| | Amount of catalyst (weight ratio) | I-PA (weight ratio) | Glycerol (weight ratio) | Ionomer (weight ratio) | 2-ethoxy ethanol (weight ratio) | Drying condition | Amount of solvent remaining | Result |
|---|---|---|---|---|---|---|---|---|
| Example 1 | 1 | 3 | | 1.65 | 4 | 35° C. 30 min | 16% | Good transfer |
| Example 2 | 1 | 3 | | 1.65 | 3 | 35° C. 30 min | 14% | Good transfer |
| Comparative Example 1 | 1 | 6.4 | 0.5 | 1.65 | | 35° C. 30 min, 140° C. 30 min | 9% | Good transfer |
| Comparative Example 2 | 1 | 3 | | 1.65 | 3 | 35° C. 45 min | 6% | Poor transfer |
| Comparative Example 3 | 1 | 1 | | 1.65 | 5 | | | Dispersion of catalyst slurry χ |

As could be seen in Table 1, since the catalyst layer manufactured by the method for manufacturing a catalyst layer according to the present specification satisfied a specific weight ratio of the carbon powder catalyst, 1-propanol, and 2-ethoxyethanol, the catalyst layer could be stably manufactured by adjusting the amount of solvent remaining to 10% to 20% with a drying time less than that in Comparative Example 1 in which glycerol was used instead of 2-ethoxyethanol.

The catalyst layer in Comparative Example 2 in which the amount of solvent remaining was 5% was not effectively transferred to one surface of the electrolyte membrane, and in the case of Comparative Example 3 in which the weight ratio of the carbon powder catalyst, the alcohol-based solvent having 1 to 6 carbon atoms, and 2-ethoxyethanol in the catalyst slurry composition did not satisfy 1:2.5:2.5 to 1:4.5:4.5, the catalyst slurry composition was in a precipitate state and thus failed to achieve a stable dispersion state.

Experimental Example 1

The membrane-electrode assemblies (MEA) to which the electrode catalyst layer in Examples 1 and 2 and Comparative Example 1 were applied were evaluated. A sPEEK-based hydrocarbon-based polymer membrane was used as the electrolyte membrane, 10BB manufactured by SGL Carbon Group was used as a gas diffusion layer (GDL), and a membrane-electrode assembly having a thickness within a range of 380 μm to 420 μm was used. A compression ratio of the GDL was set to 25%, and a glass fiber sheet was used in order to maintain the compression ratio. A unit battery cell was evaluated by manufacturing a membrane-electrode assembly having an active area of 25 cm². The unit battery cell was evaluated by using the electrodes in the same example in the anode and the cathode. A PEMFC station device manufactured by Scribner Associates Inc. was used as an evaluation device, the performance was evaluated by maintaining the temperature of the cell at 70° C. and maintaining the humidity condition at RH 50%, and the results thereof are illustrated in FIG. 2.

According to FIG. 2, it can be seen that the electrodes manufactured by the method for manufacturing a membrane-electrode assembly (MEA) according to the present specification (Examples 1 and 2) have little difference in performance from Comparative Example 1 in which glycerol was used instead of 2-ethoxyethanol.

Experimental Example 2

The activation rates of the membrane-electrode assemblies (MEA) to which the electrode catalyst layers in Examples 1 and 2 and Comparative Example 1 were applied were measured and evaluated at an interval of 5 minutes at 0.6 v and at an interval of 10 seconds at 0.3 V. A sPEEK-based hydrocarbon-based polymer membrane was used as the electrolyte membrane, 10BB manufactured by SGL Carbon Group was used as a gas diffusion layer (GDL), and a membrane-electrode assembly having a thickness within a range of 380 μm to 420 μm was used. A compression ratio of the GDL was set to 25%, and a glass fiber sheet was used in order to maintain the compression ratio. An activation rate was evaluated by manufacturing a membrane-electrode assembly having an active area of 25 cm². The activation rate was evaluated by using the electrodes in the same example in the anode and the cathode. A PEMFC station device manufactured by Scribner Associates Inc. was used as an evaluation device, the activation rate was evaluated by maintaining the temperature of the cell at 70° C. and maintaining the humidity condition at RH 100%, and the results thereof are illustrated in FIG. 3.

According to FIG. 3, it can be seen that the electrodes manufactured by the method for manufacturing a membrane-electrode assembly (MEA) according to the present specification (Examples 1 and 2) have a higher initial activation rate and a significantly higher saturation rate than those of Comparative Example 1 in which glycerol was used instead of 2-ethoxyethanol.

What is claimed is:

1. A method for manufacturing a catalyst layer, the method comprising:
preparing a solution that comprises an ionomer and a solvent, the solvent comprising 2-ethoxyethanol and an alcohol-based solvent having 1 to 6 carbon atoms;
forming a catalyst slurry composition by adding a carbon powder catalyst to the solution; and
forming a catalyst layer by applying the catalyst slurry composition onto a base material, and then drying the catalyst slurry composition,
wherein a weight ratio of the carbon powder catalyst, the alcohol-based solvent having 1 to 6 carbon atoms, and the 2-ethoxyethanol in the catalyst slurry composition is from 1:2.5:2.5 to 1:4.5:4.5, and
a content of the solvent comprising the 2-ethoxyethanol and the alcohol-based solvent having 1 to 6 carbon atoms in the catalyst layer is 10 parts by weight to 20 parts by weight based on 100 parts by weight of the catalyst layer,
wherein the drying is performed at a temperature of from 30° C. to 40° C. for 30 minutes or less.

2. The method of claim 1, wherein the alcohol-based solvent having 1 to 6 carbon atoms comprises methanol, ethanol, butanol, 1-propanol, isopropanol, or a mixture of two or more thereof.

3. The method of claim 1, further comprising, after the forming of the catalyst slurry composition and before the forming of the catalyst layer, homogenizing the catalyst slurry composition by performing sonication on the catalyst slurry composition.

4. The method of claim 1, wherein the ionomer is a fluorine-based polymer.

5. The method of claim 1, wherein the catalyst layer has a thickness of 5 µm to 15 µm.

6. The method of claim 1, wherein the alcohol-based solvent having 1 to 6 carbon atoms is 1-propanol.

* * * * *